United States Patent
Takeshima et al.

(10) Patent No.: US 8,111,939 B2
(45) Date of Patent: Feb. 7, 2012

(54) IMAGE PROCESSING DEVICE AND IMAGE PROCESSING METHOD

(75) Inventors: Hidenori Takeshima, Ebina (JP);
Toshimitsu Kaneko, Kawasaki (JP);
Nao Mishima, Inagi (JP)

(73) Assignee: Kabushiki Kaisha, Tokyo (JP)

( * ) Notice: Subject to any disclaimer, the term of this patent is extended or adjusted under 35 U.S.C. 154(b) by 519 days.

(21) Appl. No.: 12/404,578

(22) Filed: Mar. 16, 2009

(65) Prior Publication Data
US 2010/0061652 A1    Mar. 11, 2010

(30) Foreign Application Priority Data
Sep. 9, 2008 (JP) ................................. 2008-230745

(51) Int. Cl.
*G06K 9/40* (2006.01)
*H04N 1/40* (2006.01)
(52) U.S. Cl. ........................................ 382/268; 358/448
(58) Field of Classification Search .................. 382/162, 382/168, 235, 268, 276, 307; 358/448, 462, 358/530; 375/227, 254, 278, 285, 346; 701/28
See application file for complete search history.

(56) References Cited

U.S. PATENT DOCUMENTS

| | | | | |
|---|---|---|---|---|
| 7,167,595 B2 * | 1/2007 | Hiroshige et al. | ............ | 382/266 |
| 7,277,557 B2 * | 10/2007 | Ihara | .............................. | 382/100 |
| 2007/0140574 A1 | 6/2007 | Yamaguchi et al. | | |

OTHER PUBLICATIONS

Yongyi Yang, et al., "Regularized Reconstruction to Reduce Blocking Artifacts of Block Discrete Cosine Transform Compressed Images", IEEE Transactions on Circuits and Systems for Video Technology, vol. 3, No. 6, Dec. 1993, pp. 421-432.

* cited by examiner

*Primary Examiner* — Abolfazl Tabatabai
(74) *Attorney, Agent, or Firm* — Oblon, Spivak, McClelland, Maier & Neustadt, L.L.P.

(57) ABSTRACT

An image processing device includes: an estimating module configured to estimate boundaries of blocks in an input image; a characteristic value calculating module configured to calculate a characteristic value of a subject pixel group having constituent pixels including a pixel in the frame and at least one pixel that is adjacent to the pixel by calculating a degree of pixel value dispersion between the constituent pixels of the subject pixel group if all the constituent pixels belong to the same block; an strength value calculating module configured to calculate, from the characteristic value, a strength value to be used in performing pixel value smoothing; and a smoothing module configured to perform the pixel value smoothing according to the strength value.

17 Claims, 16 Drawing Sheets

FIG.9

| 0 | 1 | 0 |
|---|---|---|
| -1 | 4 | -1 |
| 0 | 1 | 0 |

FIG.10

| 0 | 0 | 0 |
|---|---|---|
| 0 | -1 | 1 |
| 0 | 0 | 0 |

FIG.11

| 0 | 0 | 0 |
|---|---|---|
| 0 | -1 | 0 |
| 0 | 1 | 0 |

IMAGE PROCESSING DEVICE AND IMAGE PROCESSING METHOD

CROSS-REFERENCE TO THE RELATED APPLICATION(S)

The present disclosure relates to the subject matters contained in Japanese Patent Application No. 2008-230745 filed on Sep. 9, 2008, which are incorporated herein by reference in its entirety.

FIELD

The present invention relates to an image processing device and a method for processing image for eliminating block noise and ringing noise.

BACKGROUND

To reduce the amount of information of an image, compression coding methods such as JPEG, MPEG-1/2/4, and H.261/263/264 which utilize block-by-block transform are widely used. When an original image obtained by decoding a compression-coded still image or moving image frames, artificial noise, such as block noise and ringing noise, is generated in many cases. If a simple smoothing filter is applied to such artificial noise, patterns (edges and texture) inherent to the image may be lost though noise is eliminated.

In view of the above, a method has been proposed which can eliminate artificial noise effectively while maintaining patterns inherent to the image by using coding information (e.g., a block size as a unit of transform and transform coefficients and quantization information of the transform) that was used at the time of compression coding. An example of such method is disclosed in the following document.

Y. Yang et al., "Regularized Reconstruction to Reduce Blocking Artifacts of Block Discrete Cosine Transform Compressed Images," IEEE Trans. Circuits and System for Video Technology, Vol. 3, No. 6, December 1993.

The above conventional technique cannot be utilized for eliminating artificial noise effectively from an image from which coding information cannot be obtained.

SUMMARY

According to an aspect of the invention, there is provided an image processing device including: an estimating module configured to estimate boundaries of blocks in an input image, the blocks being utilized as units of in-frame transform when the input image was coded; a characteristic value calculating module configured to calculate a characteristic value of a subject pixel group having constituent pixels including a pixel in the frame and at least one pixel that is adjacent to the pixel by calculating: (a) a degree of pixel value dispersion between the constituent pixels of the subject pixel group if all the constituent pixels belong to the same block; and (b) degrees of pixel value dispersions each obtained between each of the constituent pixels of the subject pixel group and a pixel that is adjacent to the constituent pixels and belongs to the same block as the constituent pixels if the constituent pixels belong to two or more distinct blocks; a strength value calculating module configured to calculate, from the characteristic value, a strength value to control the strength of smoothing between the constituent pixels of the subject pixel group; and a smoothing module configured to perform pixel value smoothing between the constituent pixels of the subject pixel group according to the strength value calculated by the strength value calculating module.

According to another aspect of the invention, there is provided an image processing device including: an estimating module configured to estimate boundaries of blocks in an input image, the blocks being utilized as units of in-frame transform when the input image was coded; a dividing module configured to generate a plurality of sections having boundaries different from the block boundaries estimated by the estimating module; a characteristic value calculating module configured to calculate a characteristic value of a subject pixel group having constituent pixels including a pixel in one of the sections and at least one pixel that is adjacent to the pixel by calculating: (a) a degree of pixel value dispersion between the constituent pixels of the subject pixel group if all the constituent pixels belong to the same block; and (b) degrees of pixel value dispersions each obtained between each of the constituent pixels of the subject pixel group and a pixel that is adjacent to the constituent pixels and belongs to the same block as the constituent pixels if the constituent pixels belong to two or more distinct blocks; a strength value calculating module configured to calculate a strength value indicating strength to control the strength of smoothing between the constituent pixels of the subject pixel group, the strength value being calculated to be a smaller value as the difference increases; a smoothing module configured to perform pixel value smoothing between the constituent pixels with strength corresponding to the strength value calculated by the intensity value calculating module to obtain output pixel values; and a combining module configured to combine sets of output pixel values output by the smoothing module for the respective sections into a single frame.

According to another aspect of the invention, there is provided a method for processing image, the method including: estimating boundaries of blocks in an input image, the blocks being utilized as units of in-frame transform when the input image was coded; calculating a characteristic value of a subject pixel group having constituent pixels including a pixel in the frame and at least one pixel that is adjacent to the pixel by calculating: (a) a degree of pixel value dispersion between the constituent pixels of the subject pixel group if all the constituent pixels belong to the same block; and (b) degrees of pixel value dispersions each obtained between each of the constituent pixels of the subject pixel group and a pixel that is adjacent to the constituent pixels and belongs to the same block as the constituent pixels if the constituent pixels belong to two or more distinct blocks; calculating, from the characteristic value, a strength value to control the strength of smoothing between the constituent pixels of the subject pixel group; and performing pixel value smoothing between the constituent pixels of the subject pixel group according to the strength value.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

FIG. 9 shows example filter coefficients of a discrete approximation of second-order differentiation.

FIG. 10 shows example filter coefficients of a discrete approximation of horizontal first-order differentiation.

FIG. 11 shows example filter coefficients of a discrete approximation of vertical first-order differentiation.

DETAILED DESCRIPTION OF THE EMBODIMENTS

Figure 1:
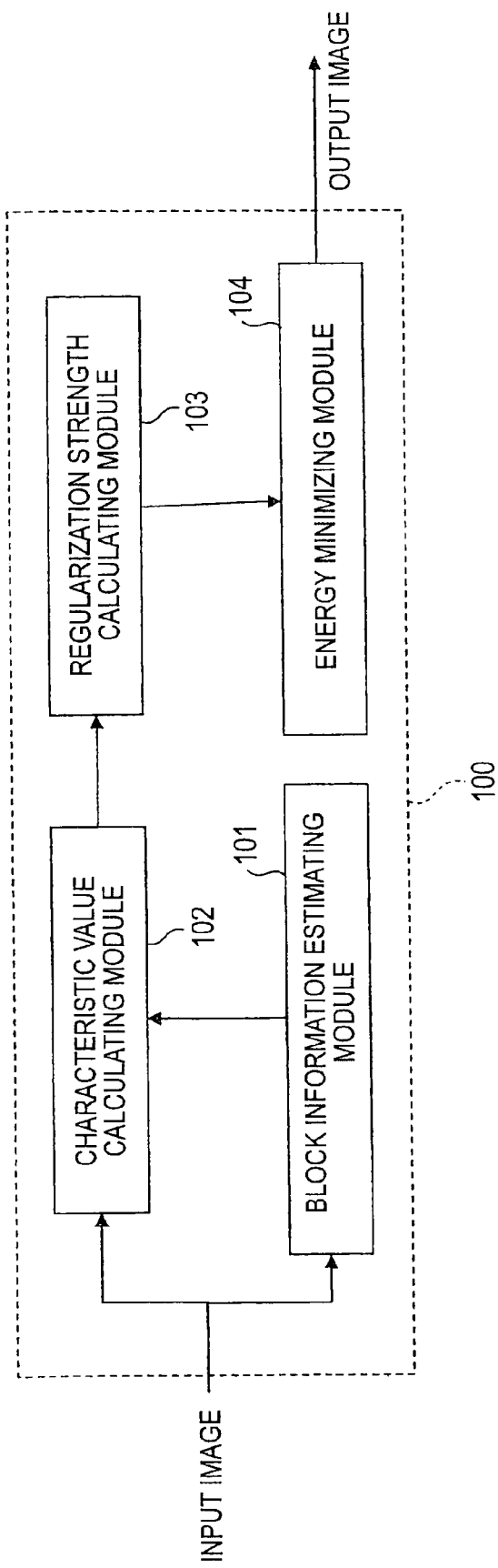
FIG. 1 shows an image processing device according to a first embodiment.

Hereinafter, embodiments of the invention will be described with reference to the drawings. In the following description, the same or similar components will be denoted by the same reference numerals, and the duplicate description thereof will be omitted.

First Embodiment

FIG. 1 shows a configuration of an image processing device 100 according to a first embodiment. The image processing device 100 according to the first embodiment performs processing of converting an input decoded image (hereinafter referred to as "input image") into an image having minimum artificial noise, such as block noise and ringing. A description will be made of a case that the input image is already decoded and block information that was used in the coding cannot be obtained.

The image processing device 100 is equipped with a block information estimating module 101, a characteristic value calculating module 102, a regularization strength calculating module 103, and an energy minimizing module 104.

The block information estimating module 101 estimates boundaries of blocks in a frame (hereinafter, such boundaries are referred to as "block boundaries") using additional information of an input image when it can be obtained, the blocks being units of transform that were used at the time of coding of the input image. In the embodiment, the block information estimating module 101 determines an estimated block size as block information.

The additional information that is used for estimating block boundaries is file format information, MIME information (i.e., a character string indicating a data format), etc. For example, if the file type of an input image is JPEG, MPEG, or H.264, it can be inferred that the cording was performed with a block size of 8×8 pixels ("pixels" will be omitted below), 8×8, or 4×4. Even if coding information cannot be obtained from a decoder that decoded an input image, in many cases the input image is accompanied by additional information. For example, a file extension or a MIME type may be obtained or information relating to a file format may be obtained from additional information such as metadata. Even in the case where information relating to a block size that was used in actual coding cannot be obtained, it is possible to estimate a block size from such additional information. The block information estimating module 101 determines, as block information, size data of an estimated block size.

Another configuration is possible in which it is inferred without using additional information that transform processing of coding was performed with a given block size such as 8×8 which is relatively common and the boundaries of those blocks are estimated to be block boundaries.

The characteristic value calculating module 102 sequentially calculates, while shifting the subject pixel group, characteristic values using the block information that has been estimated by the block information estimating module 101. The characteristic value indicates the degree of correlation between pixels of a set (hereinafter referred to as "subject pixel group") of plural adjoining pixels (hereinafter referred to as "constituent pixels") in a frame of the input image. For example, in the case of a frame for which estimated block information indicates that the block size was M×N, it is inferred that boundaries obtained by dividing the frame in units of M×N pixels are block boundaries.

Figure 2:
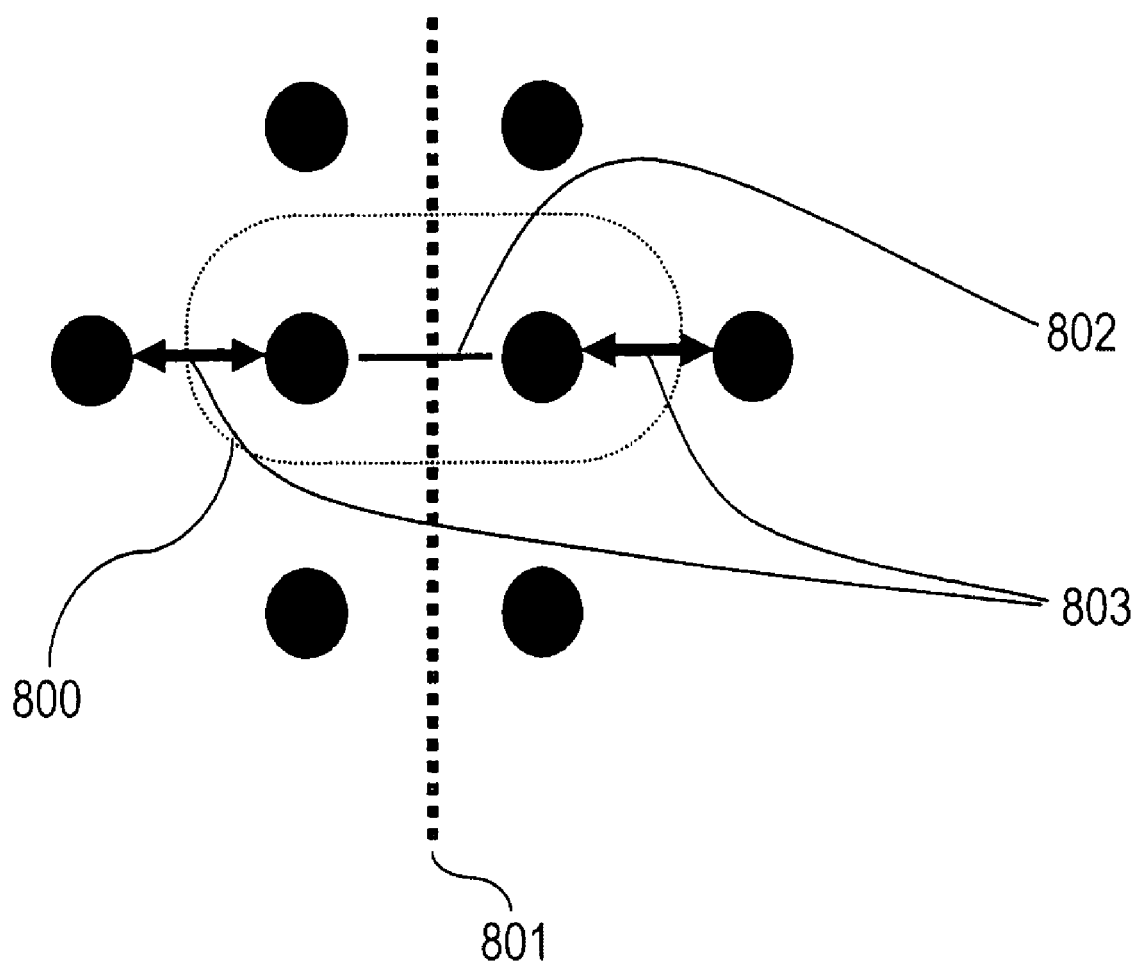
FIG. 2 shows how to calculate edge strength in a case that the subject pixel group bridges different blocks.
Figure 3:
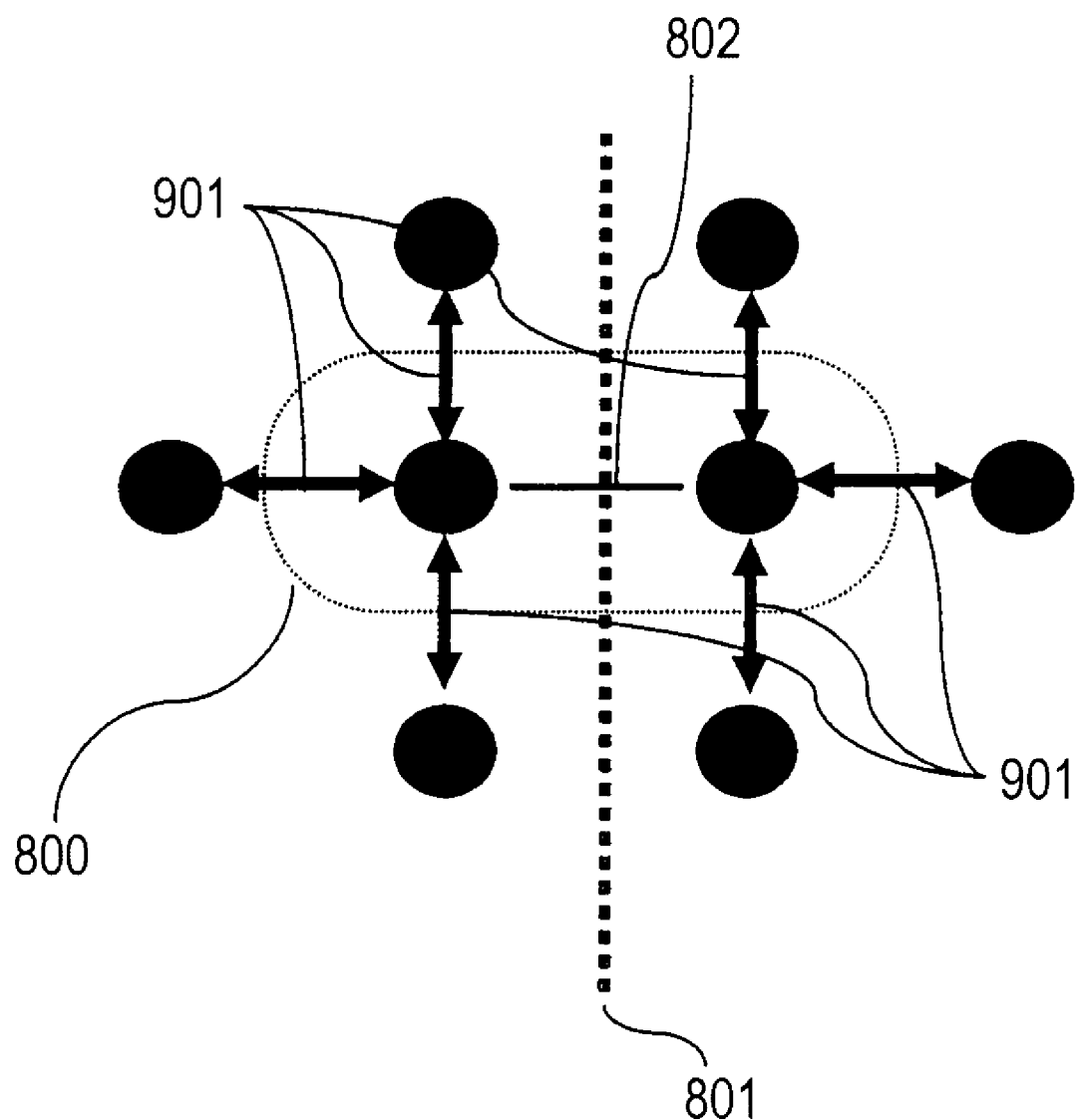
FIG. 3 also shows how to calculate edge strength in a case that the subject pixel group bridges different blocks.

It is an appropriate way of shifting the subject pixel group to produce a pixel group whose constituent pixels are different than of the preceding pixel group. In this embodiment, the constituent pixels are two adjoining pixels. The number of pixels of the subject pixel group may be an arbitrary number other than two. The characteristic value indicates a pixel value dispersion (e.g., a dispersion(s) in luminance or RGB values) between the pixels of the subject pixel group. The embodiment employs, as the characteristic value, the difference (hereinafter referred to as "edge strength") between the pixel values of the constituent pixels. In this case, a characteristic value of a subject pixel group that bridges a block boundary is calculated according to edge strength values calculated using nearby pixels. For example, as shown in FIGS. 2 and 3, in calculating a characteristic value 802 of a subject pixel group 800 whose pixels belong to plural blocks, edge strength between the pixel value of at least one constituent pixel of the subject pixel group and the pixel value of a nearby pixel that inferentially belongs to the same block as that constituent pixel is calculated. FIG. 2 shows a case that edge strength 803 between one pixel that belongs to the same block as each pixel of the subject pixel group 800 and is adjacent to the latter in a direction that crosses an estimated edge direction is calculated. FIG. 3 shows a case that edge strength values 901 between three pixels that belong to the same block as each pixel of the subject pixel group 800 and are adjacent to the latter are calculated. The magnitude of a characteristic value 802 of the subject pixel group 800 is calculated on the basis of the calculated nearby edge strength values 803 or 901. For example, a representative value (e.g., a maximum value, a minimum value, a median, or an average) of the calculated nearby edge strength values 803 or 901 is utilized as a characteristic value of the subject pixel group.

The regularization strength calculating module 103 calculates, on the basis of the characteristic value obtained by the characteristic value calculating module 102, regularization strength which correspond to a weight to be used in smoothing pixel values of the constituent pixels of the subject pixel group. A function that represents a relationship between the regularization strength and the characteristic value is defined in advance, and regularization strength is calculated by substituting the characteristic value into the function. The function should be defined so that the regularization strength becomes smaller as the characteristic value (i.e., the difference between pixel values) increases. Where characteristic values are discrete values, a table may be held which contains regularization strength values that correspond to respective characteristic values. The details will be described later.

The energy minimizing module 104 smoothes the pixel values of the pixels in the frame according to a regularized reconstruction method, according to the regularization strength values calculated by the regularization strength calculating module 103. This processing is called energy minimization. The details will be described later.

Figure 4:
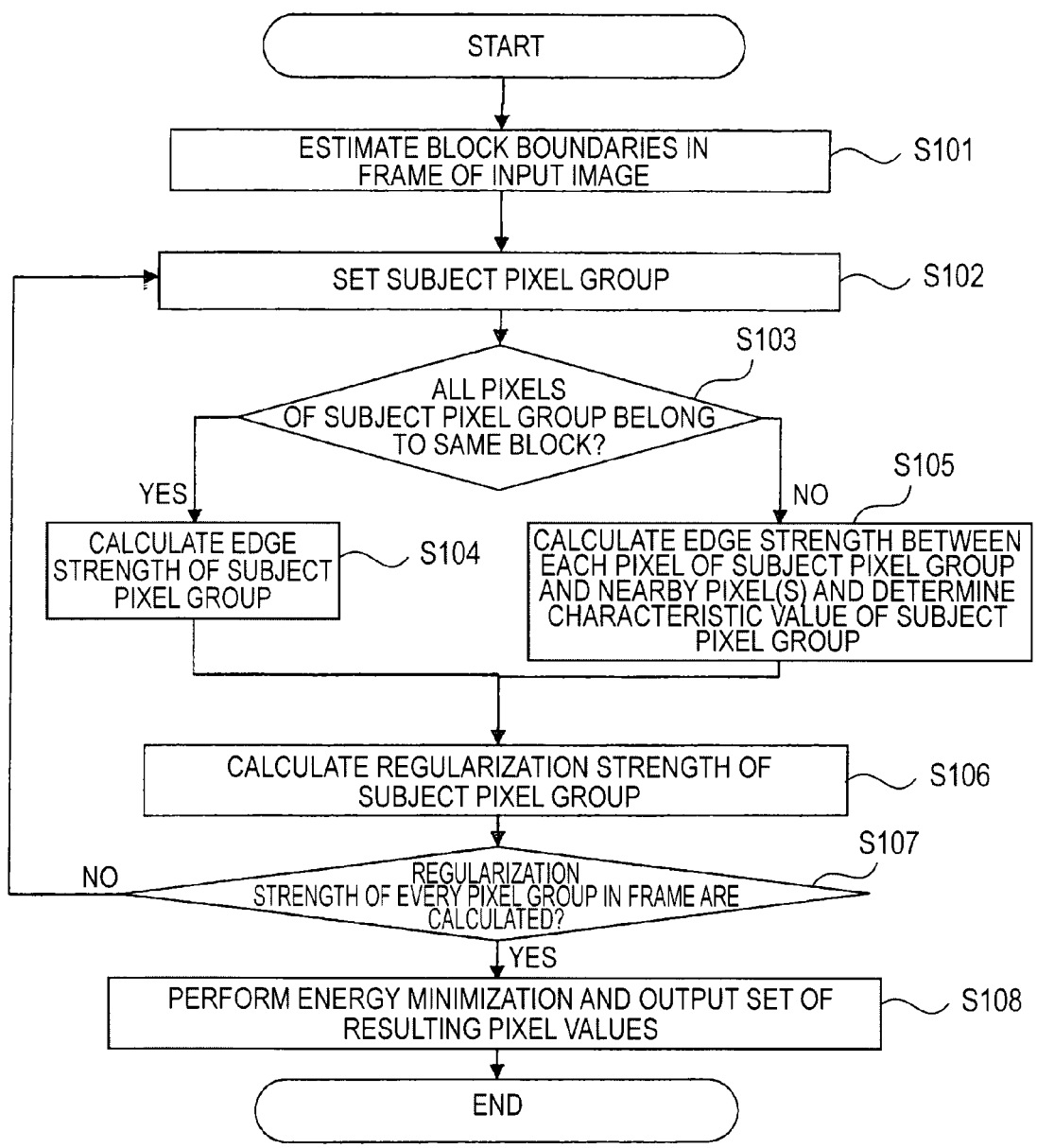
FIG. 4 is a flowchart showing the operation of the image processing device according to the first embodiment.

FIG. 4 is a flowchart showing an operation of the image processing device according to the first embodiment.

First, at step S101, the block information estimating module 101 estimates a block size that was used in coding a frame of an input image. At step S102, plural adjoining pixels among the pixels in the frame are set as a subject pixel group. At step S103, the characteristic value calculating module 102 determines whether it is inferred that all the pixels of the subject pixel group belonged to the same block using the block size that was estimated by the block information estimating module 101. If it is inferred that all the pixels of the subject pixel group belonged to the same block (S103: YES), at step S104 the characteristic value calculating module 102 calculates, as a characteristic value of the subject pixel group, edge strength between the pixels of the subject pixel group. If it is inferred that not all of the pixels of the subject pixel group belonged to the same block (S103: NO), at step S105 the characteristic value calculating module 102 calculates a characteristic value of the subject pixel group on the basis of edge strength between each pixel of the subject pixel group and a nearby pixel(s) (e.g., a representative value such as a maximum value or an average is used). At step S106, the regularization strength calculating module 103 calculates regularization strength of the subject pixel group on the basis of the calculated characteristic value. At step S107, it is determined whether regularization strength of every pixel group in the frame has been calculated. If it is determined that regularization strength of every pixel group in the frame has been calculated (S107: YES), the energy minimizing module 104 smoothes the pixel values of the pixels in the frame according to the regularized reconstruction method. At step S108, a set of all resulting pixel values is output as an output image. If it is determined that regularization strength of every pixel group in the frame has not been calculated yet (S107: NO), a new subject pixel group is set at step S102 and the series of steps are performed again.

In FIG. 4, energy minimization is performed after regularization strength is calculated for every pixel group in the frame. Alternatively, an energy function that is defined for only part of the pixel groups may be minimized.

Next, the regularized reconstruction method will be described. First, constraining equations are defined for an input image as simultaneous equations and an energy function is defined which has data terms that serve to have the simultaneous equations satisfied to as high a degree as possible and regularization terms for noise elimination. An output image is obtained which minimizes the energy function.

In general artificial noise elimination, an input image and an output image are the same in resolution. However, scaling can be performed at the same time as artificial noise elimination, in which case an input image and an output image are necessarily different from each other in resolution. To deal with both of the case that an input image and an output image are the same in resolution and the case that they are different in resolution, a description will be made by letting L and M represent the number of pixels of an input image and that of an output image, respectively. The numbers L and M may be the same.

Indices i={1, 2, 3, . . . L} are assigned to the pixels of an input image and their pixel values are represented by $y_1$, $y_2$, $y_3$, . . . . Where each pixel value is not a scalar value, y is a vertical vector. For example, where each pixel has three-dimensional values (RGB), y is a 3-dimensional vertical vector. Indices j={1, 2, 3, . . . , M} are also assigned to an output signal and pixel values are represented by $x_1$, $x_2$, $x_3$, . . . .

Figure 5:
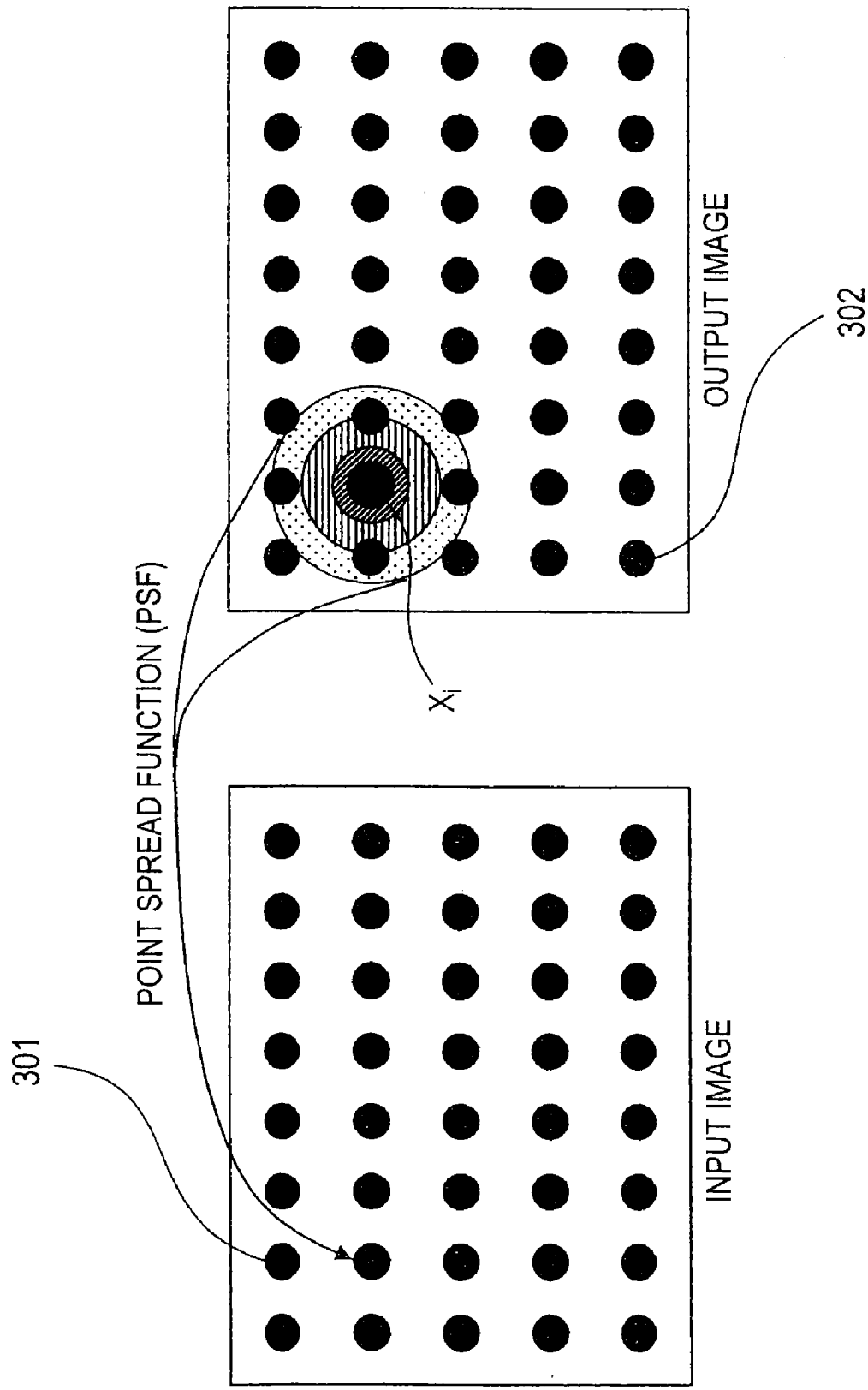
FIG. 5 shows example weight coefficients in a case that an input image and an output image are the same in resolution.
Figure 6:
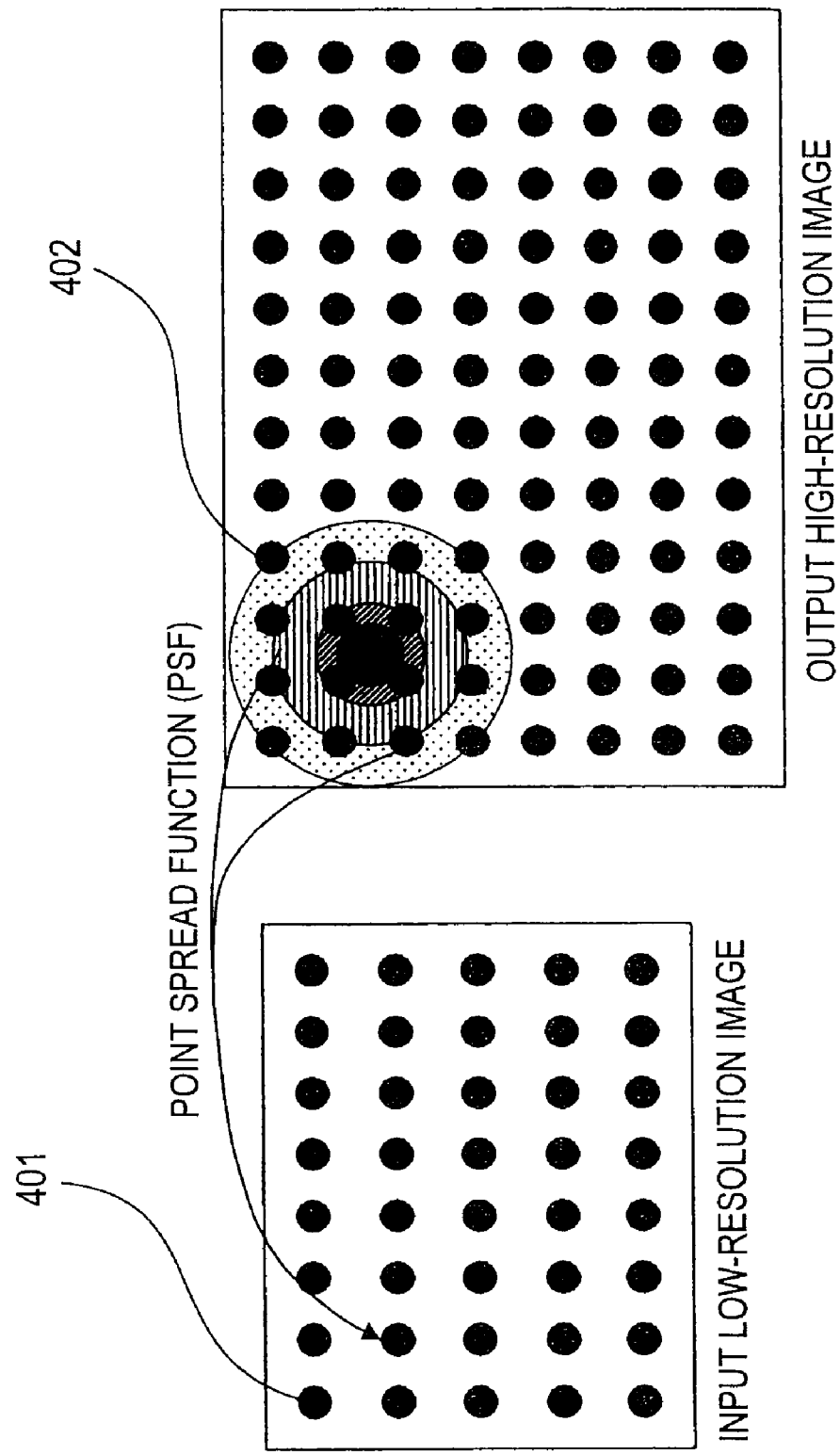
FIG. 6 shows example weight coefficients in a case that an input image and an output image are different in resolution.

In the artificial noise elimination, usually, it is not preferable that each pixel value of an output image deviates from a corresponding pixel value of an input image to a large extent. In general artificial noise elimination, L and M are the same and it is an appropriate procedure to calculate pixel values x of an output image so that no large deviations occur from the relationship y=x. However, for example, where an input image is sharpened by correcting for blurring of inherent patterns in addition to noise caused by compression coding, it is preferable to obtain blur-eliminated values of an output image by regarding the pixel value of each input pixel 301 as one obtained by performing a sum-of-products operation on pixel values of output pixels 302 (see FIG. 5) For another example, where scaling is involved where L is not the same with M, it is preferable to calculate pixel values x of an output image so that a value obtained by performing a sum-of-products operation corresponding to scaling on pixel values x of output pixels 402 comes close to the pixel value of an input pixel 401 (see FIG. 6). In general, it is an appropriate procedure to establish simultaneous equations in which each input pixel value is represented by a weighted sum of output pixel values. It is seen that to prevent pixel values of an output image from deviating from those of an input image to a large extent, an optimization problem should be solved in which Equation (1) is satisfied to as high a degree as possible, where $w_{ij}$ is the weight coefficient for the index i.

$$y_i = \sum_j w_{ij} x_j \qquad (1)$$

The weight coefficients are known as a point spread function (PSF). If constraining equations that enable estimation of weighted sum values of output pixel values can be obtained in addition to an input image, new equations may be added by assigning indices to those constraining equations: the number L can be increased by the number of added equations. This method for adding constraining equations is frequently used in the case where L<M. A specific method is described in the non-patent document S. C. Park et al., "Super-Resolution Image Reconstruction: A Technical Overview," IEEE Signal Processing Magazine, pp. 21-36, May 2003. This method can also be used even in the case where L is less than M.

L equations are obtained by establishing constraining equations of Equation (1) in a number that is equal to the number of pixels of the input image. In matrix expression, vector x=$(x_1, x_2, x_3, \ldots, x_M)^T$ and vector y=$(y_1, y_2, y_3, \ldots, y_L)^T$. Introducing matrices W=$((w_{11}, w_{12}, w_{13}, \ldots, w_{1M})^T, (w_{21}, w_{22}, w_{23}, \ldots, w_{2M})^T, \ldots)^T$, the equations corresponding to the respective indices i can be combined into a matrix equation y=Wx.

An object of the artificial noise elimination is to suppress artificial noise while minimizing deviations from the above constraining equations. Now, a function of x, $E_{reg}(x)$, is employed whose value increases as the artificial noise increases. The energy minimizing module 104 eliminates artificial noise by minimizing an energy function E which is defined by the following Equation (2).

$$E = \|y - Wx\|_2^2 + \lambda E_{reg}(x) \quad (2)$$

The subscript of the norm indicates that the norm is an L2 norm (the superscript means squaring). The parameter $\lambda$ is a parameter for controlling the strength of regularization (regularization strength).

Next, the regularization strength which is calculated by the regularization strength calculating module 103 will be described for the case of L=M. The regularized reconstruction method can eliminate artificial noise effectively using the function $E_{reg}(x)$ whose value is expected to increase as the artificial noise increases. In the following description, it is assumed that two pixels are extracted to form a subject pixel group.

Figure 7:
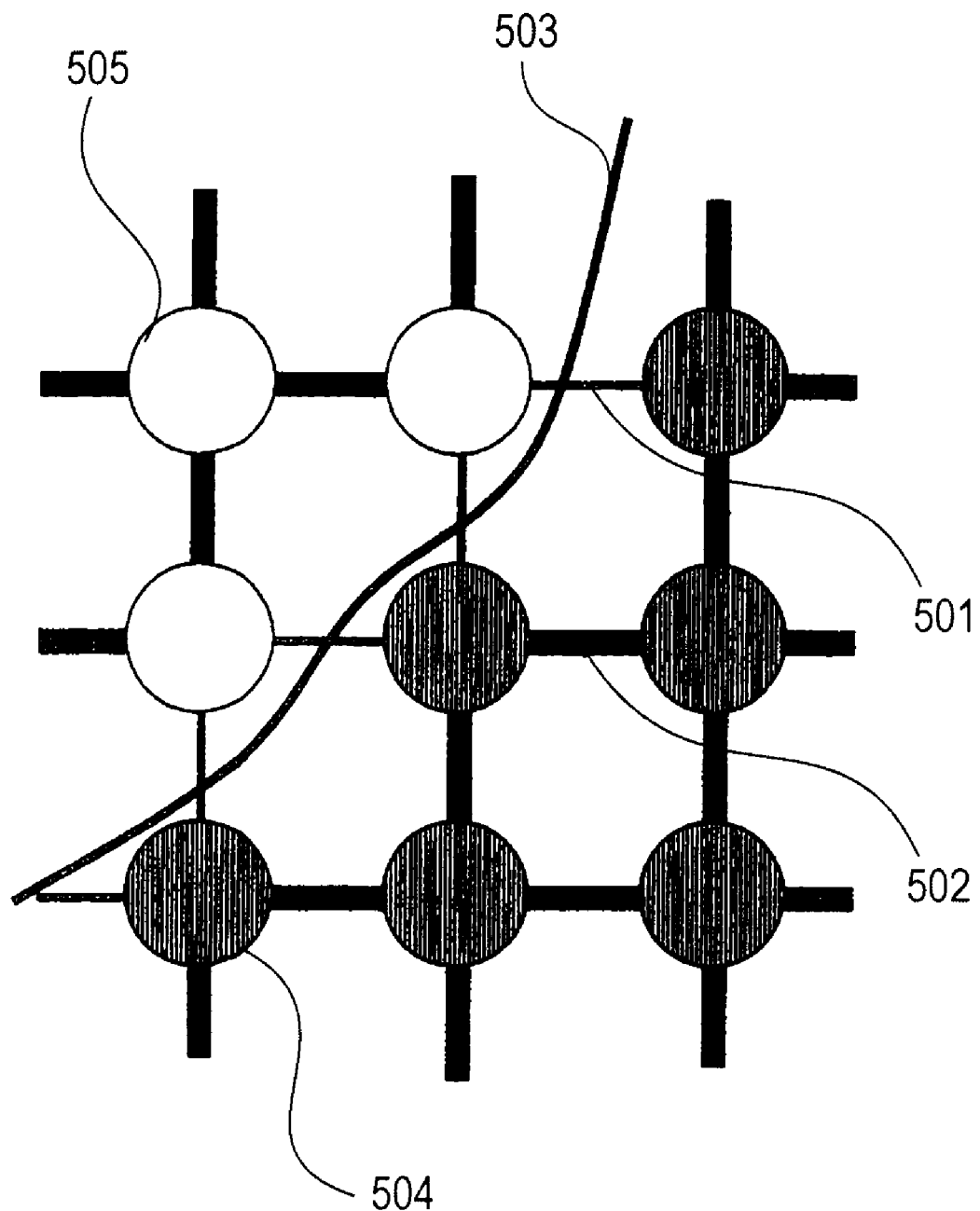
FIG. 7 shows example weighting of smoothing at an outline of an object.

As the function $E_{reg}(x)$, a function is designed which eliminates artificial noise (e.g., ringing) occurring in a frame of an image. Humans exhibit a property that they have difficulty recognizing a weak edge that exists near a strong edge. Therefore, the image quality as perceived by humans would be improved if ringing noise is smoothed where the edge strength is low. In view of this, as shown in FIG. 7, no smoothing is performed at, for example, an interval 501 between pixels whose pixel values are low in correlation and strong smoothing is performed at, for example, an interval 502 between pixels whose pixel values are high in correlation. This makes it possible to selectively eliminate such noise as ringing in flat portions without affecting patterns inherent to an image such as an outline of an object. For example, a function defined by the following equation can be used as a function having the above property.

$$E_{reg}(x) = \Sigma g_{i,j} e(x_i, x_j)$$

Figure 8:
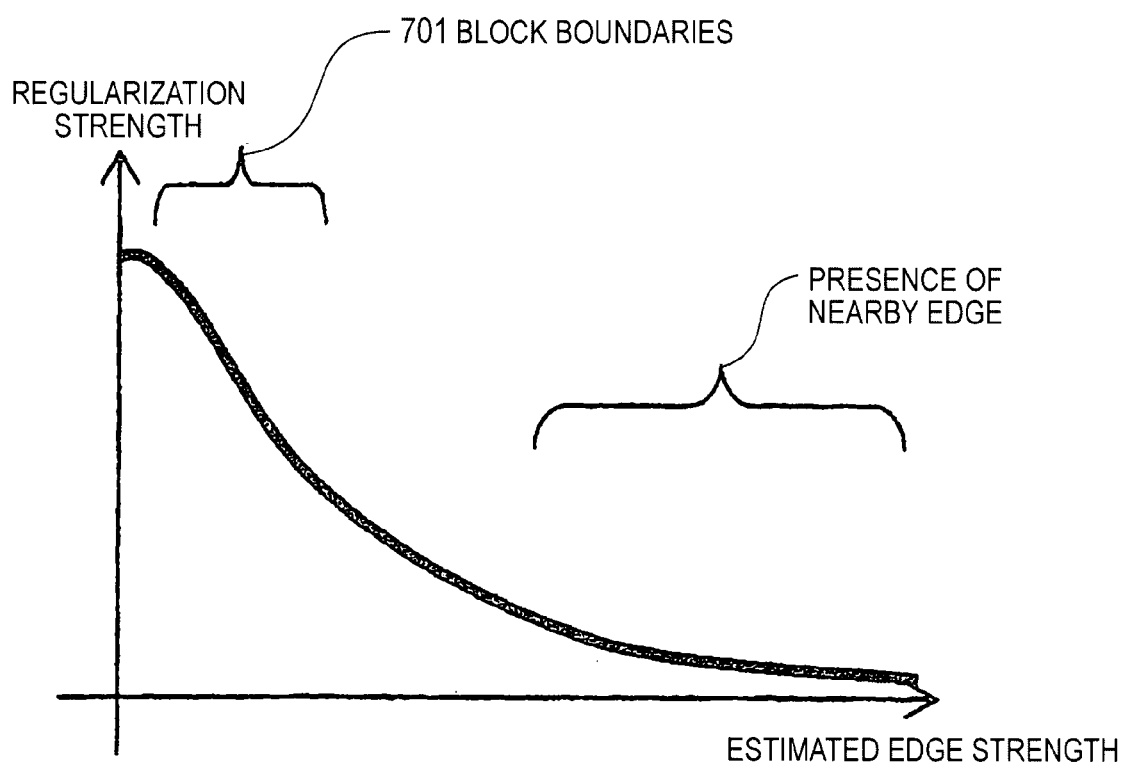
FIG. 8 shows a relationship between the characteristic value and the regularization strength.

In the above equation, the symbol $\Sigma$ means weighted summation of the values of regularization terms e(•) for the subject pixel group (i, j). The regularization terms e(•) may be any function as long as its value decreases as the edge strength between the pixels of the subject pixel group increases (see FIG. 8). For example, the following Equations (3) can be used which includes an exponential function.

$$e(x_i, x_j) = (x_i - x_j)^2 \quad (3)$$
$$g_{i,j} = \exp\left(-\frac{d_{i,j}}{2\gamma^2}\right)$$

Figure 9:
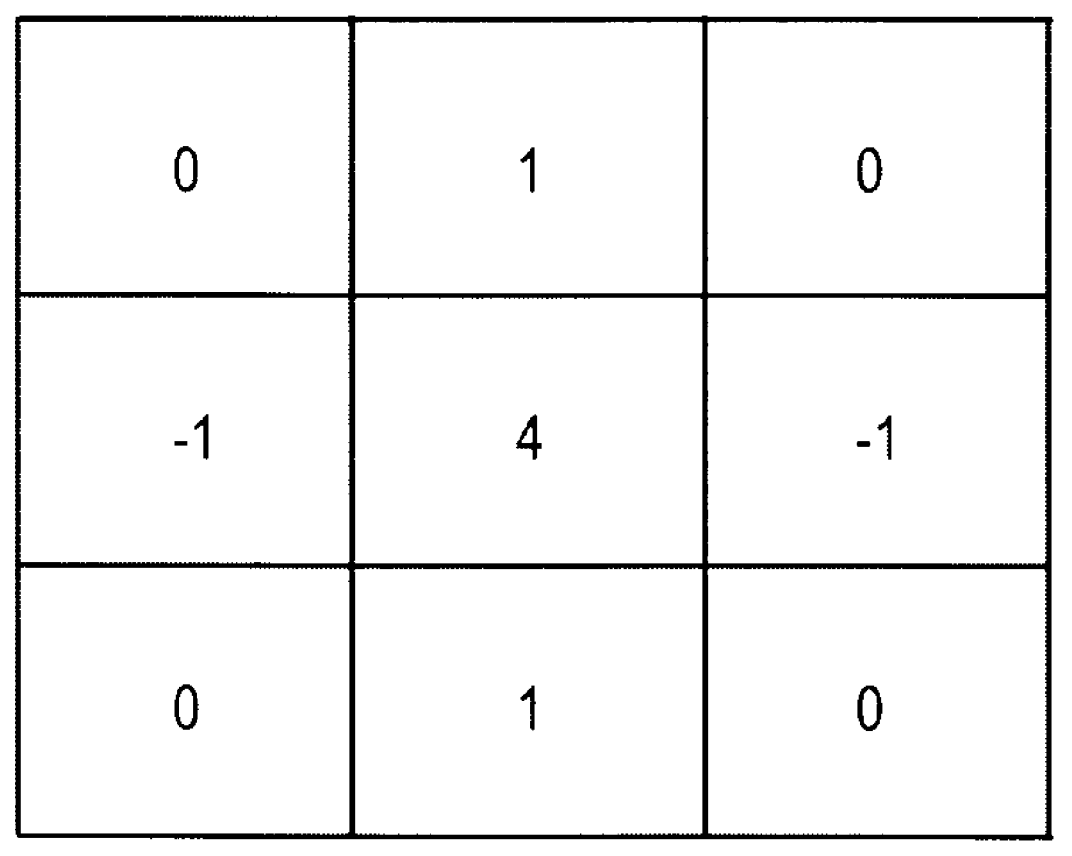
Figure 10:
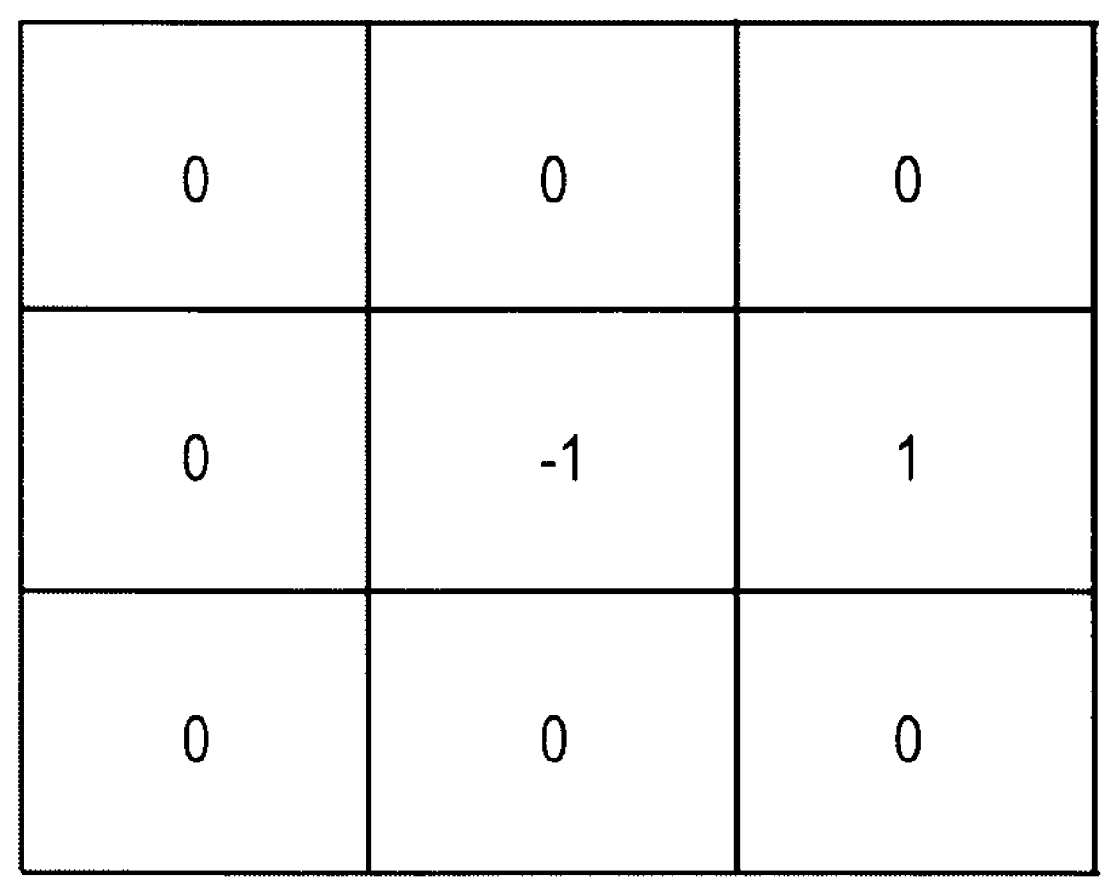
Figure 11:
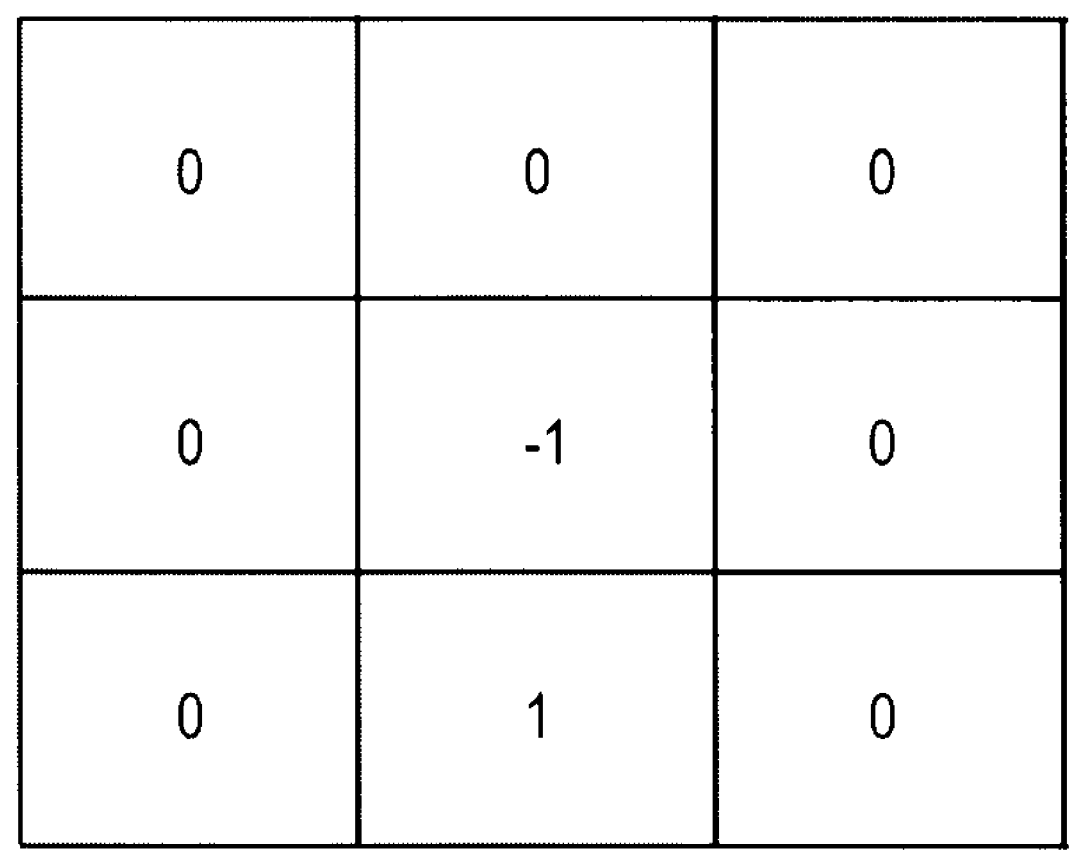

In the minimization of the energy function E, the squared difference $(x_i - x_j)^2$ between the pixel values has a role of regularization. Mathematically, when the cost of regularization is not quadratic, it does not necessarily have a role of regularization. However, for the sake of convenience, $E_{reg}(x)$ is a regularization term irrespective of whether it has a role of regularization for a linear system. The parameter $g_{i,j}$ represents a strength of regularization (regularization strength). The parameter $d_{i,j}$ is the characteristic value calculated by the characteristic value calculating module 102, and may be obtained by performing a proper sum-of-products operation on the pixel values of the subject pixel group (i, j) of the input image. For example, a discrete approximation of first-order differentiation, that is, a sum-of-products operation using filter coefficients shown in FIG. 10 or 11, may be performed on the pixel values. The coefficients of the sum-of-products operation may be filter coefficients of a discrete approximation of second-order differentiation shown in FIG. 9 or another set of coefficients. As a further alternative, a median of differences between each pixel value and the pixel values of nearby nine pixels may be calculated (nonlinear operation). Where the filter of FIG. 9 is used, the subject pixel group consists of five constituent pixels. Where the filter of FIG. 10 or 11 is used, the subject pixel group consists of two constituent pixels.

Next, a description will be made of a specific method by which the energy minimizing module 104 minimizes the energy function (step S108). For example, sequential minimization and parallel minimization can be used for the minimization of the energy function.

In a process of each of the above kinds of minimization, optimization is performed by repetitive calculations. In such optimization, temporary x is necessary as initial values, which can be generated by, for example, interpolating an input image. Whereas any interpolation method can be used, the following methods, for example, may be used.

(A) Linear Interpolation

Interpolation is made by using two known points. It is desirable that the two points used for interpolation be located as close to an interpolation subject point. Let a1 and a1+1 represent the positions of two known points and let y1 and y2 represent their pixel values. Furthermore, let a1+c represent the position of an interpolation subject point. Then, an interpolation value $y_c$ is calculated by the following Equation (4).

$$y_c = y_1 + c(y_2 - y_1) \quad (4)$$

(B) Cubic Convolution Method

Interpolation is made by using four known points that are arranged at known regular intervals. It is assumed that the four points used for interpolation are located within a range of 2 that is centered by an interpolation subject point. An interpolation value is obtained by multiplying the values of the respective points by weighting kernel w(d) that is centered by the interpolation subject point and adding resulting values together. The weighting kernel w(d) can be calculated by the following Equation (5).

$$w(d) = \begin{cases} (\gamma + 2)|d|^3 - (\gamma + 3)|d|^2 + 1 & |d| < 1 \\ \gamma|d|^3 - 5\gamma|d|^2 + 8\gamma|d| - 4\gamma & 1 \le |d| < 2 \\ 0 & \text{otherwise} \end{cases} \quad (5)$$

Parameter d represents the distance of each point from the interpolation subject point. Parameter $\gamma$ is a parameter for controlling the interpolation function and is set at $-1.0$ or $-0.5$, for example.

Sequential Minimization

Consideration will be given to a case that $E_{reg}(x)$ is a function that can be expressed as the following Equation (6) using a proper matrix R because it has quadratic energy terms.

$$E_{reg}(x) = x^T R^T R x \quad (6)$$

For example, $E_{reg}(x)$ can be expressed in the above-mentioned form in which $E_{reg}(x)$ is a weighted sum of the squared differences between pixel values of adjoining pixels.

Figure 12:
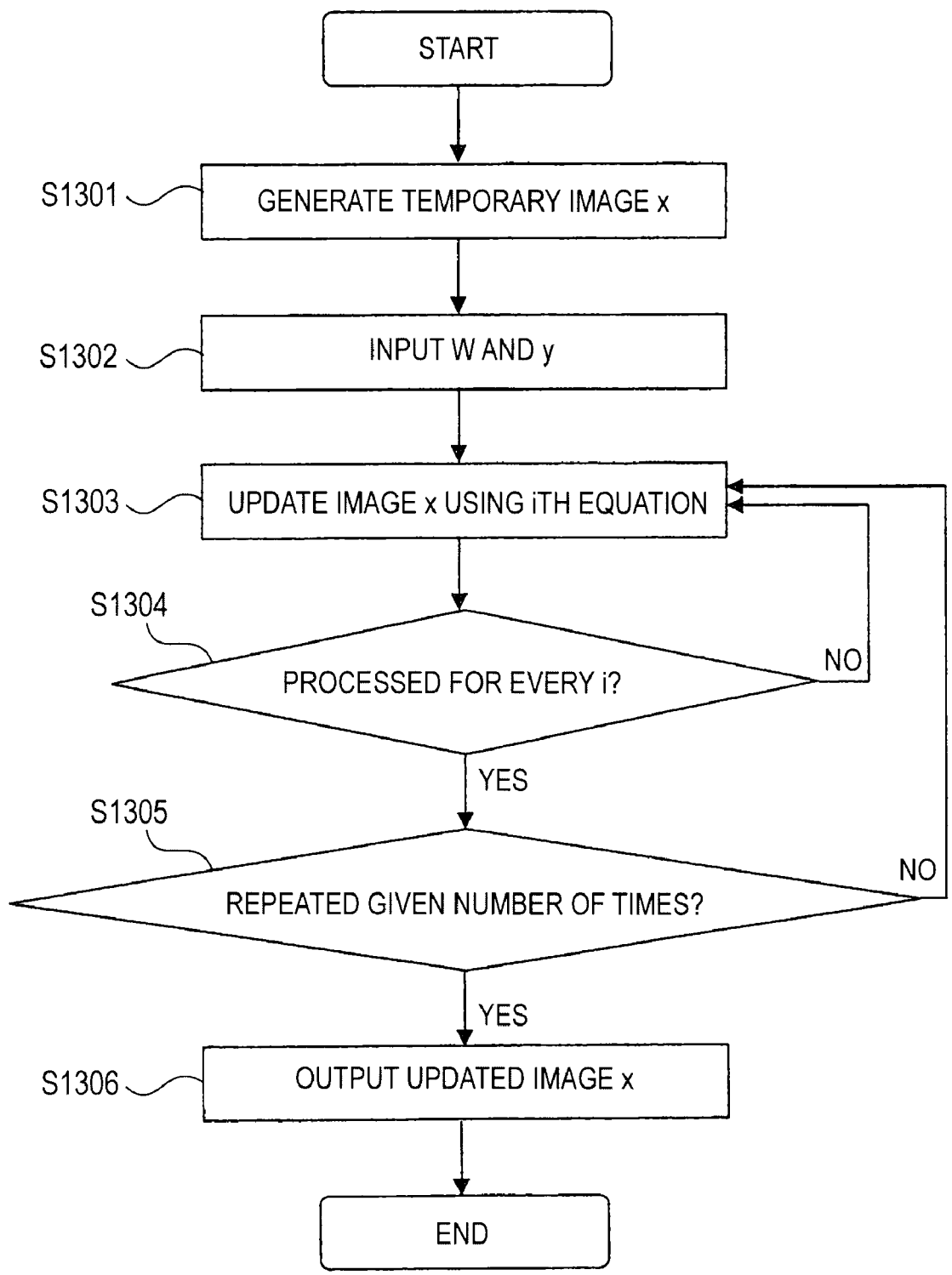
FIG. 12 shows an operation of sequential minimization.

FIG. 12 shows a process of the sequential minimization. Its algorithm will be described below. This process is performed by the energy minimizing module 104.

(Step 1) At step S1301, temporary x is generated by, for example, interpolating an input image. The interpolation can be performed by linear interpolation or the cubic convolution method.

(Step 2) The i-th equation of $y=W_x$ is expressed as the following Equations (7) and (8).

$$y_i = W_i x \qquad (7)$$

$$W_i = (w_{i1}, w_{i2}, \ldots, w_{iM}) \qquad (8)$$

In the Equation (8), $W_i$ is a horizontal vector of weights and $y_i$ and $W_i$ are given as inputs at step S1302. To obtain x that satisfies the following Equation (9) without receiving much influence of noise, in the sequential minimization a step size $\beta_i$ and a constant $\delta_i$ are given separately and the following repetitive calculations are performed (an example without parallel processing; steps S1303 and S1304).

$$y_i = W_i x \qquad (9)$$

The expression shown in the following Equation (10) means estimated values of x as shown in the following Equation (11).

$$\hat{x} \qquad (10)$$

$$\hat{x} \leftarrow \begin{cases} \hat{x} + \beta_i(y_i - W_i\hat{x} + \delta_i) & \text{if } y_i - W_i\hat{x} + \delta_i < 0 \\ \hat{x} + \beta_i(y_i - W_i\hat{x} - \delta_i) & \text{if } y_i - W_i\hat{x} - \delta_i > 0 \\ \hat{x} & \text{otherwise} \end{cases} \qquad (11)$$

The step size $\beta_i$ and the constant $\delta_i$ may take the same value for every i (e.g., $\beta_i=1$, $\delta_i=1$). Alternatively, for example, $\beta_i$ may be changed from one equation to another according to each equations as shown in the following Equation (13).

$$\beta_i = 1/\|W[i]\|^2 \qquad (12)$$

(Step 3) A matrix equation 0=Rx is also evaluated on a equation-by-equation basis as in that case of y=Wx. In this case, the step size is multiplied by $\lambda$.

(Step 4) Steps 2 and 3 are performed repeatedly a given number of times (step S1305).

(Step 5) A resulting image represented by the following Equation (13) is output at step S1306.

$$\hat{x} \qquad (13)$$

Parallel Minimization

Figure 13:
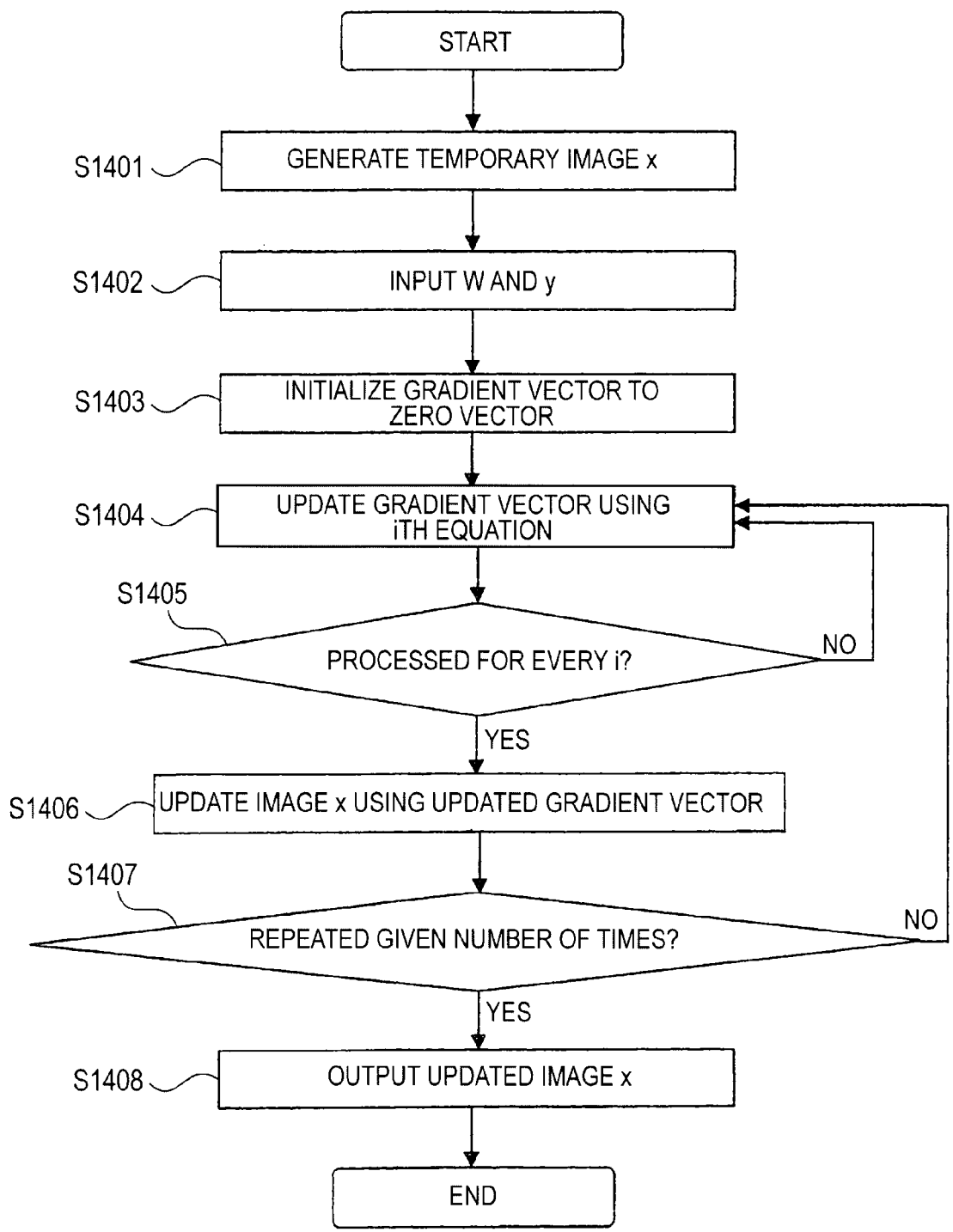
FIG. 13 shows an operation of parallel minimization.

Next, a parallel minimization method (steepest descent method) will be described with reference to FIG. 13.

(Step 1) At step S1401, temporary x is generated by, for example, applying linear interpolation or the cubic interpolation method to an input image. The interpolation can be performed by linear interpolation or the cubic convolution method.

(Step 2) An operation of calculating a gradient $\partial E/\partial x$ of the energy function E with respect to the vector x and advancing the estimation values of x, which are shown by the following Equation (14), by a step obtained by multiplying the gradient $\partial E/\partial x$ by $-\beta$.

$$\hat{x} \qquad (14)$$

The update can be performed according to the following Equation (15).

$$\hat{x} \leftarrow \hat{x} - \beta(\partial E/\partial x) \qquad (15)$$

A specific procedure is as follows. W and y are given at step S1402. Where the above equation is calculated as it is, first, at step S1403, a gradient vector of the energy function E is held by a buffer or the like (not shown) and is initialized to a zero vector. Then, each component of the gradient vector $\partial E/\partial x$ is evaluated, whereby the gradient vector $\partial E/\partial x$ of the energy function E is updated (steps S1404 and S1405). After every equation has been evaluated, at step S1406 the gradient vector $\partial E/\partial x$ is multiplied by $\beta$ and a result is subtracted from the estimated values, which are expressed as the following Equation (16).

$$\hat{x} \qquad (16)$$

(Step 3) Step 2 is performed for a given number of times (step S1407). There is no decisive parameter, and the parameters are set with a tradeoff between the image quality and the processing cost. In practice, for example, the number of times of repetition is set at a proper number (e.g., about one to 20) in view of the processing cost and parameter values that provide high image quality are searched for while the value $\beta$ is varied.

(Step 4) At step S1408, a resulting output image, which is represented by the following Equation (17) is output.

$$\hat{x} \qquad (17)$$

A description will be made of an example of estimating a block size from an input image. Since block noise generates characteristic image patterns, block boundaries can be estimated even in the case where no format information of an image can be obtained.

For example, assume that a frame is divided into a plurality of blocks having 16×16 pixels with all of their boundaries being block boundaries and each block is divided into blocks having a block size of 4×4, 8×8, or 16×16. A block size will be selected from these candidates in each of the 16×16 blocks. First, for each candidate block size, edge strength is calculated for all pairs of pixels (or several pairs of pixels selected properly) belonging to different blocks. And a representative value (e.g., an average or a median) of the calculated edge strength values is determined. It is expected that the representative value of the calculated edge strength values should be large for a correct candidate block size and should be small for a wrong candidate block size. Therefore, in principle, a block size can be estimated by selecting, as a block size, a candidate block size that provides a largest representative value. In actuality, however, the probability that a large candidate block size is selected is high if this principle is applied as it is. Therefore, it is an appropriate measure to utilize a certain bias so that small candidate block sizes are more apt to be selected. For example, representative values for 4×4 and 8×8 may be multiplied by 1.5 and 1.25, respectively, before the comparison.

The above description of the regularization strength was directed to the case that the number L of pixels of the input image was equal to the number M of pixels of the output image. That is, regularization strength was calculated for the subject pixel group of the input image. An output image whose number M of pixels is different from the number L of pixels of an input image can be obtained by adding a step of determining regularization strength for the subject pixel group of the output image on the basis of regularization strength values for pixel groups of the input image.

For example, the following operation is performed for the position of each of output pixels constituting the subject pixel group of an output image. First, a pixel of an input image that is located in the vicinity of (e.g., closest to, k-closest to, or in a given range around) each output pixel. Then, regularization strength values are acquired for pixel groups of the input image that includes the thus-found pixel and a representative value (e.g., a maximum value, a minimum value, an average, or a median) of those regularization strength values is determined. Finally, the thus-determined representative value is employed as regularization strength of the subject pixel group.

With the above procedure, an image can be generated that is different from an input image in resolution whereas block noise and ringing can be eliminated.

Ringing can be suppressed by calculating energy terms in the above-described manner. However, if block noise was generated by image compression, in a subject pixel group located at an estimated block boundary (i.e., a subject pixel group consisting of plural pixels that include pixels belonging to different blocks), the edge strength (in the above-described example, d) of the subject pixel group is estimated too high due to the block noise and the regularization strength is lowered irrespective of the edge strength before the image compression. In view of this, to cope with block noise, in the embodiment, the regularization strength is changed by a method described below.

Although the embodiment is directed to the case that the subject pixel group consists of two pixels ($e(x_i, x_j)$), subject pixel groups consisting of three or more pixels may be set sequentially. For example, a procedure is possible in which a subject pixel group, as shown in the following Equation (18), having five pixels that are a pixel i and four pixels adjacent to it is set for the pixel i, and a regularization energy term $E_{reg}(x)$ is set as the following Equation (19).

$$e(x_i, x_j, x_k, x_l, x_m) = (4x_i - x_j - x_k - x_l - x_m)^2 \quad (18)$$

$$E_{reg}(x) = \sum_i g_i e(x_i, x_{i+1}, x_{i-1}, x_{i+width}, x_{i-width}) \quad (19)$$

$$g_i = \exp\left(-\frac{d_i}{2\gamma^2}\right)$$

It is assumed that indices i are assigned in raster scan order and the parameter "width" represents the number of pixels in the horizontal direction of the image. In the example shown by the Equation (18), the parameter d is one obtained by a discrete approximation of second-order differentiation (see FIG. 9). In the above example, the parameter d is not limited to the one corresponding to the example shown by the Equation (18).

The above image processing device according to the embodiment is effective because block noise and ringing can be eliminated even in the case where quantization information or block boundary information cannot be obtained from a decoder of an input image. Therefore, the image processing device can be cascade-connected to an existing image decoder from behind. The image processing device is effective because it can be cascade-connected from behind to an image decoder whose specification is not publicized.

Humans exhibit a property that they have difficulty recognizing a weak edge that exists near a strong edge. Therefore, the image quality as perceived by humans would be improved greatly if an estimated block boundary is smoothed in the case where the edge strength is low. In view of this, also for block noise (as done above for ringing), consideration will be given to how to smooth an estimated block boundary is smoothed in the case where the edge strength is low.

Figure 14:
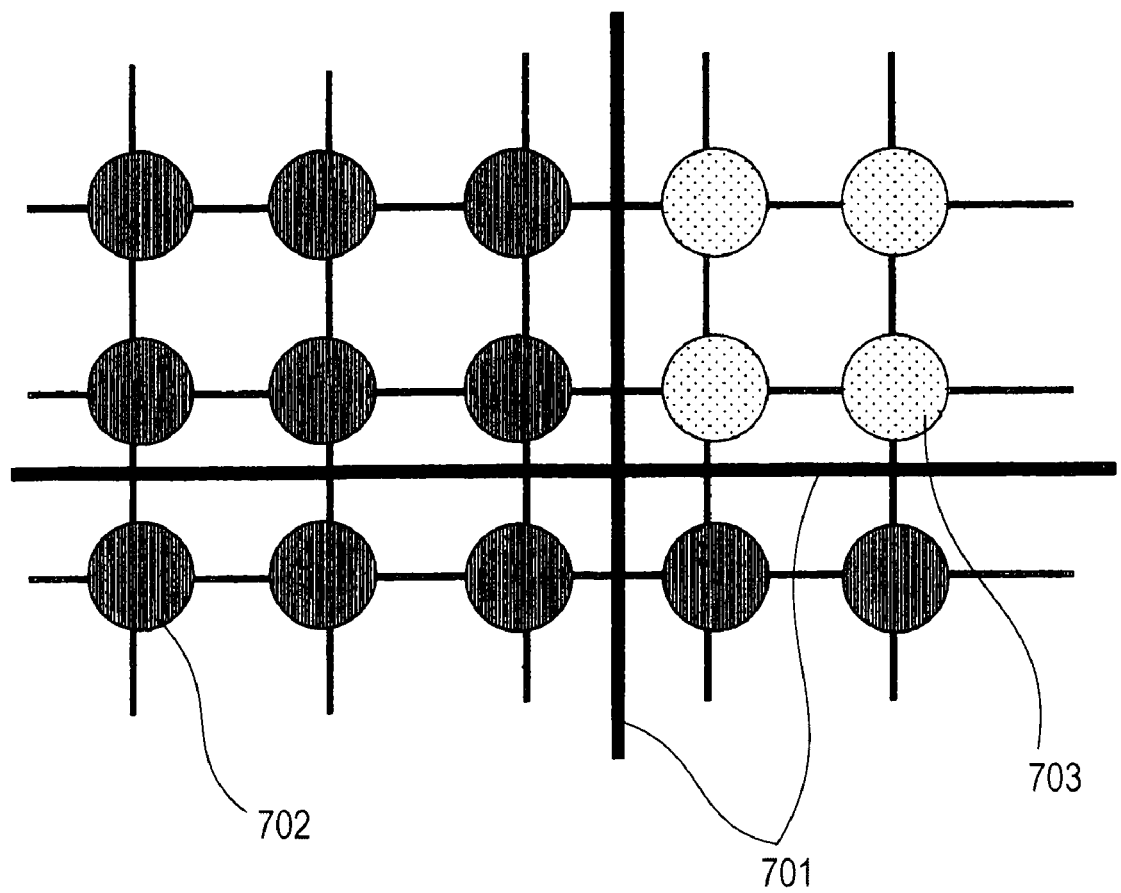
FIG. 14 shows an example of distortion due to block boundaries.

In image compression using transform coding as typified by JPEG and MPEG, compression is performed by dividing the entire image into blocks of 4×4 or 8×8, performing linear transform such as DCT in each bock, and quantizing resulting coefficients. Therefore, an image that has been restored by inverse transform has strong noise at boundaries between the blocks that were used for the compression. FIG. 14 shows an example.

FIG. 14 illustrates a restoration result in which block noise is generated due to transform coding in a portion where the pixel value should vary smoothly. Blocks having dark pixels such as a pixel 702 and a block having bright pixels such as a pixel 703 exist so as to be divided by block boundaries 701. In a portion where the pixel value should vary smoothly like the portion shown in FIG. 14, it is desired to smooth the bock boundaries located therein. However, edge strength that is calculated between the pixels of a subject pixel group bridging a block boundary has a large value due to block noise and hence the corresponding regularization strength is set low.

The embodiment employs a regularized reconstruction method that utilizes an inter-pixel smoothing term whose weight depends on the subject pixel group. The weight of the smoothing term is set larger when the inter-pixel edge strength is lower. Furthermore, positions that are highly likely located at block boundaries are estimated and edge strength between nearby pixels that belong to the same block is used as the weight of a subject pixel group that would bridge a block boundary. Also in this case, the weight is set larger when the edge strength between nearby pixels that belong to the same block is lower. Ringing is smoothed by setting the inter-pixel weight larger when the inter-pixel edge strength is lower which is lower than the edge strength of patterns inherent to the image. When a block boundary exists between the pixels of a subject pixel group, the block boundary is smoothed if nearby patterns are smooth and is not smoothed if nearby patterns are not smooth.

Therefore, even if no block boundary actually exists between pixels that were inferred as being located on both sides of a block boundary, if an edge or texture exists in that portion, an edge or texture would also exist around that portion. Therefore, even if a portion where no block boundary exists is determined a block boundary portion erroneously, it does not cause serious influence on patterns inherent to the image. As such, the image processing device according to the embodiment can effectively eliminate artificial noise from even an input image whose coding information cannot be utilized.

Second Embodiment

An image processing device according to a second embodiment is different from the image processing device according to the first embodiment in that parallel processing is performed on one frame. Since the processing speed is increased, the image processing device according to the second embodiment is effective in performing real-time processing on an input image. The above-described regularized reconstruction method enhances the effect of smoothing by propagating a dispersion in each pixel value by repetitive calculations. It is desired to realize parallel processing by such a method that this smoothing effect is lowered by as low a degree as possible.

One method for attaining parallel processing is to divide a frame into sections having a proper size and processing the sections by separate parallel processing modules. In this case, high block noise smoothing effect is not expected in portions where a parallel processing boundary coexists with a block boundary. Furthermore, pixel value dispersions near such a boundary are not propagated. These problems can be solved by overlapping sections and blocks and averaging results obtained in the overlaps, which makes it possible to leave the block noise smoothing effect to some extent.

Figure 15:
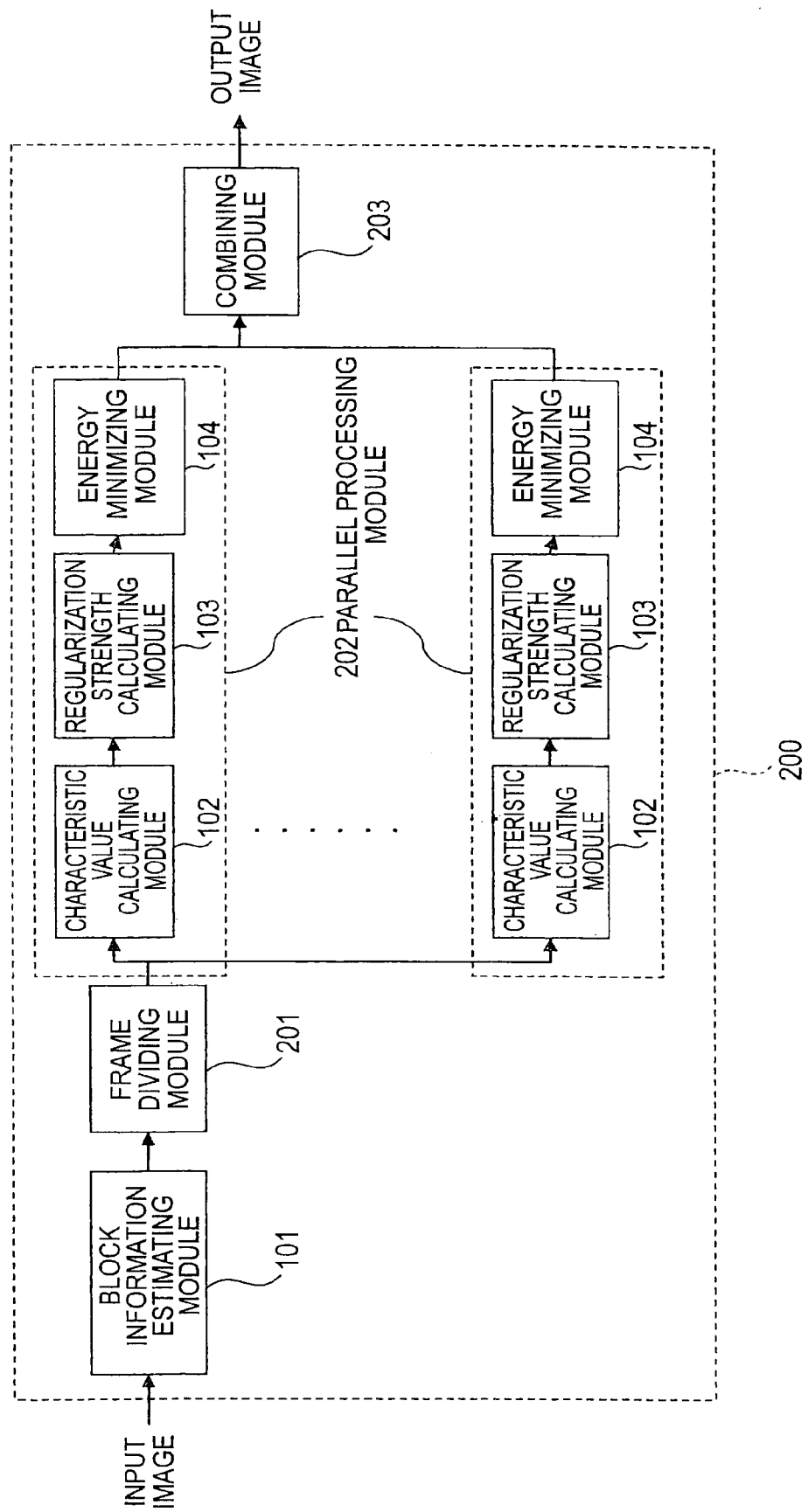
FIG. 15 shows an image processing device according to a second embodiment.

FIG. 15 shows the configuration of an image processing device 200 according to the second embodiment.

The image processing device 200 is different from the image processing device 100 of FIG. 1 in that the former is equipped with a frame dividing module 201 and a combining module 203 as well as plural parallel processing modules 202.

Figure 16:
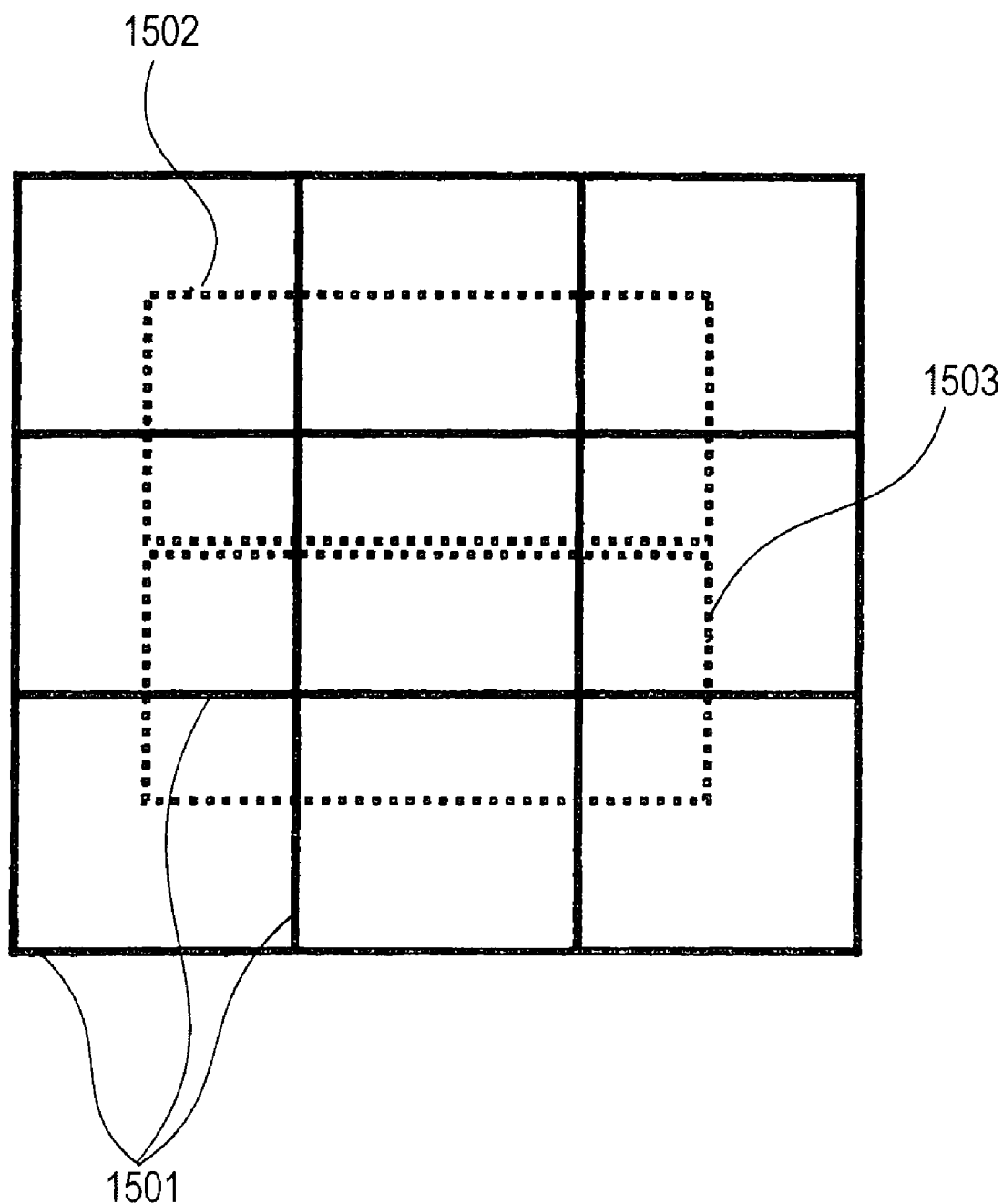
FIG. 16 shows examples of parallel processing ranges and estimated block boundaries.

The frame dividing module 201 divides a frame of an input image into sections having a proper side, the number of sections being suitable for the number of parallel processing modules 202. The frame dividing module 201 divides a frame in such a manner that section boundaries do not overlap with block boundaries that are inferred by the block information estimating module 101. FIG. 16 shows an example method for dividing a frame in such a manner that parallel processing boundaries do not overlap with block boundaries. Where block boundaries can be estimated, for example, sections (processing ranges) 1502 and 1503 corresponding to the respective parallel processing modules 202 are set in such a manner that the section boundaries do not overlap with estimated block boundaries 1501. Where block boundaries cannot be estimated, sections may be set so as not to overlap with block boundaries that are estimated by assuming a proper block size (e.g., 8×8). This dividing method can be used together with the above-mentioned method of overlapping sections and blocks.

Each of the parallel processing modules 202 is equipped with the characteristic value calculating module 102, the regularization strength calculating module 103, and the energy minimizing module 104 which are shown in FIG. 1. Each parallel processing module 202 calculates output pixel values for a corresponding one of the sections generated by the frame dividing module 201.

The combining module 203 combines sets of output pixel values of the sections calculated by the parallel processing modules 202, respectively, and outputs an image corresponding to the one original frame.

Although the image processing device and method according to each of the embodiments are directed to a two-dimensional image, the concept of each embodiment can easily be extended so as to be applicable to another kind of image. For example, the invention can be applied to the elimination of artificial noise caused by compression to (a) a moving image in a two-dimensional space and time axes; (b) a three-dimensional voxel image in a two-dimensional space and depth axes; (c) a four-dimensional image in a two-dimensional plane, depth, and time axes. In such applications, each coding block is a block (superblock) of three dimensions, four dimensions, or even higher dimensions rather than two dimensions. An N-dimensional space (N: natural number) is utilizeed as a coordinate system for an image. In general, the pixel is defined as a very small region in the N-dimensional space and the pixel value is defined as an integration value of signal strength that is sampled for a certain time in the pixel region. For the sake of convenience, the center of the pixel is especially called a pixel position. Also in the case where the coordinate system includes the time axis as in the case of a moving image, a pixel value is regarded as being obtained by sampling (integrating) a signal for a certain time (shutter speed). Pixels need not always be arranged densely. For example, in the elimination of artificial noise from a moving image, although pixels are arranged in a three-dimensional space (horizontal, vertical, and time directions), gaps appear in the time direction in the case where the shutter speed is lower relative to the frame rate. For another example, where an imaging system is such that part of light for adjacent pixels is added to light of the subject pixel and contributes to an integration value together with the latter, an overlap exists between pixels. A very small region in the N-dimensional space is called a pixel in such a sense as to encompass the above kinds of regions.

The image processing device according to each of the above embodiments can eliminate block noise and ringing effectively even in the case where information relating to coding cannot be obtained from a decoder. Therefore, the image processing device according each embodiment can be used in such a manner as to be cascade-connected to an arbitrary image decoder from behind. For example, when a low-resolution moving image having coding distortion originally is to be reproduced with a TV receiver, an image that is free of the coding distortion can be obtained by cascade-connecting the image processing device according each embodiment to an image decoder from behind.

Each of the above embodiments is directed to the case that information relating to the block size of an image is not given. However, noise can be eliminated by the above-described method also from an image for which information relating to its block size can be obtained from a decoder. Information relating to a block size may be used as appropriate for estimating a block size.

The instructions in the processes described in each of the above embodiments can be performed according to programs. Those instructions are recorded as programs on or in a magnetic disk, an optical disc, a semiconductor memory, or a like recording medium. A computer can realize the same operations as the operations of the signal processing device according to each embodiment by reading the programs from the recording medium and causing the CPU to execute the instructions described in the programs. The computer may acquire or read the programs over a network. Furthermore, an operating system, middleware such as database management software or network-related software, or the like that operates on a computer according to instructions of a program that has been installed in the computer or an embedded system from the recording medium may execute part of each process of each embodiment.

In the invention, the computer is not limited to a personal computer and include a processor, a microcomputer, or the like that is incorporated in information processing equipment. That is, the term "computer" is a generic term of apparatus and devices capable of implementing the functions according to each embodiment of the invention.

It is to be understood that the invention is not limited to the specific embodiments described above and that the invention can be embodied with the components modified without departing from the spirit and scope of the invention. The invention can be embodied in various forms according to appropriate combinations of the components disclosed in the embodiments described above. For example, some components may be deleted from the configurations described as the embodiments. Further, the components described in different embodiments may be used appropriately in combination.

What is claimed is:

1. An image processing device comprising:
   an estimating module configured to estimate boundaries of blocks in an input image, the blocks being utilized as units of in-frame transform when the input image was coded;
   a characteristic value calculating module configured to calculate a characteristic value of a subject pixel group having constituent pixels including a pixel in the frame and at least one pixel that is adjacent to the pixel by calculating:

(a) a degree of pixel value dispersion between the constituent pixels of the subject pixel group if all the constituent pixels belong to the same block; and
(b) degrees of pixel value dispersions each obtained between each of the constituent pixels of the subject pixel group and a pixel that is adjacent to the constituent pixels and belongs to the same block as the constituent pixels if the constituent pixels belong to two or more distinct blocks;
a strength value calculating module configured to calculate, from the characteristic value, a strength value to control the strength of smoothing between the constituent pixels of the subject pixel group; and
a smoothing module configured to perform pixel value smoothing between the constituent pixels of the subject pixel group according to the strength value calculated by the strength value calculating module.

2. The device of claim 1, wherein the smoothing module is configured to:
calculate a first term from the strength value of the subject pixel group and pixel values of the constituent pixels;
calculate a second term whose value decreases when a difference between a sum of output pixel values of the constituent pixels multiplied by weights that are determined according to a point spread function and a pixel value in the constituent pixels decreases; and
calculate, as new pixel values of the constituent pixels, pixel values by adjusting the pixel values of the output pixels to minimize a weighted sum of the first term and the second term.

3. The device of claim 2, wherein the characteristic value calculating module is configured to calculate a characteristic value using the difference between pixel values.

4. The device of claim 3, wherein the strength value calculating module is configured to calculate the strength value to be a smaller value as the difference increases.

5. The device of claim 2, wherein the estimating module is configured to calculate, as the block boundaries, boundaries obtained by dividing the frame into blocks having a given block size.

6. The device of claim 5, wherein the estimating module is configured to:
calculate degrees of correlation between pixel values of pixels that are located on both sides of each of block boundaries obtained by dividing the frame into blocks having each of plural candidate block sizes; and
calculate, as the block boundaries, boundaries of blocks having a candidate block size that provides lowest correlation.

7. The device of claim 2, wherein the estimating module is configured to:
acquire format information of the input image;
calculate a block size from the format information; and
calculate, as the block boundaries, boundaries obtained by dividing the frame into blocks having the estimated block size.

8. The device of claim 7, wherein the estimating module is configured to:
calculate degrees of correlation between pixel values of pixels that are located on both sides of each of block boundaries obtained by dividing the frame into blocks having each of plural candidate block sizes; and
calculate, as the block boundaries, boundaries of blocks having a candidate block size that provides lowest correlation.

9. An image processing device comprising:
an estimating module configured to estimate boundaries of blocks in an input image, the blocks being utilized as units of in-frame transform when the input image was coded;
a dividing module configured to generate a plurality of sections having boundaries different from the block boundaries estimated by the estimating module;
a characteristic value calculating module configured to calculate a characteristic value of a subject pixel group having constituent pixels including a pixel in one of the sections and at least one pixel that is adjacent to the pixel by calculating:
(a) a degree of pixel value dispersion between the constituent pixels of the subject pixel group if all the constituent pixels belong to the same block; and
(b) degrees of pixel value dispersions each obtained between each of the constituent pixels of the subject pixel group and a pixel that is adjacent to the constituent pixels and belongs to the same block as the constituent pixels if the constituent pixels belong to two or more distinct blocks;
a strength value calculating module configured to calculate a strength value indicating strength to control the strength of smoothing between the constituent pixels of the subject pixel group, the strength value being calculated to be a smaller value as the difference increases;
a smoothing module configured to perform pixel value smoothing between the constituent pixels with strength corresponding to the strength value calculated by the strength value calculating module to obtain output pixel values; and
a combining module configured to combine sets of output pixel values output by the smoothing module for the respective sections into a single frame.

10. A method for processing image, the method comprising:
estimating boundaries of blocks in an input image, the blocks being utilized as units of in-frame transform when the input image was coded;
calculating a characteristic value of a subject pixel group having constituent pixels including a pixel in the frame and at least one pixel that is adjacent to the pixel by calculating:
(a) a degree of pixel value dispersion between the constituent pixels of the subject pixel group if all the constituent pixels belong to the same block; and
(b) degrees of pixel value dispersions each obtained between each of the constituent pixels of the subject pixel group and a pixel that is adjacent to the constituent pixels and belongs to the same block as the constituent pixels if the constituent pixels belong to two or more distinct blocks;
calculating, from the characteristic value, a strength value to control the strength of smoothing between the constituent pixels of the subject pixel group; and
performing pixel value smoothing between the constituent pixels of the subject pixel group according to the strength value.

11. The method of claim 10, wherein the pixel value smoothing comprises:
calculating a first term from the strength value of the subject pixel group and pixel values of the constituent pixels;
calculating a second term whose value decreases when a difference between a sum of output pixel values of the constituent pixels multiplied by weights that are determined according to a point spread function and a pixel value in the constituent pixels decreases; and calculating, as new pixel values of the constituent pixels, pixel values by adjusting the pixel values of the output pixels to minimize a weighted sum of the first term and the second term.

12. The method of claim 11, wherein the characteristic value is calculated by calculating a characteristic value using the difference between pixel values.

13. The method of claim 12, wherein the strength value is calculated by calculating the strength value to be a smaller value as the difference increases.

14. The method of claim 11, wherein boundaries obtained by dividing the frame into blocks having a given block size are calculated as the block boundaries.

15. The method of claim 14, wherein the boundaries are estimated by a procedure comprising:

calculating degrees of correlation between pixel values of pixels that are located on both sides of each of block boundaries obtained by dividing the frame into blocks having each of plural candidate block sizes; and calculating, as the block boundaries, boundaries of blocks having a candidate block size that provides lowest correlation.

16. The method of claim 10, wherein the boundaries are estimated by a procedure comprising:

acquiring format information of the input image;

calculating a block size from the format information; and utilizing, as the block boundaries, boundaries obtained by dividing the frame into blocks having the estimated block size.

17. The method of claim 16, wherein the boundaries are estimated by a procedure comprising:

calculating degrees of correlation between pixel values of pixels that are located on both sides of each of block boundaries obtained by dividing the frame into blocks having each of plural candidate block sizes; and calculating, as the block boundaries, boundaries of blocks having a candidate block size that provides lowest correlation.

\* \* \* \* \*

UNITED STATES PATENT AND TRADEMARK OFFICE
CERTIFICATE OF CORRECTION

PATENT NO. : 8,111,939 B2  
APPLICATION NO. : 12/404578  
DATED : February 7, 2012  
INVENTOR(S) : Takeshima et al.

Page 1 of 1

It is certified that error appears in the above-identified patent and that said Letters Patent is hereby corrected as shown below:

On the title page, Item (73), the Assignee's name is incorrect. Item (73) should read:

Item -- (73) Assignee: Kabushiki Kaisha Toshiba, Tokyo (JP) --

Signed and Sealed this  
Third Day of April, 2012

David J. Kappos  
*Director of the United States Patent and Trademark Office*